(No Model.)
J. O. DIXON & W. R. TACKER.
VEHICLE BRAKE.
No. 531,719.
Patented Jan. 1, 1895.
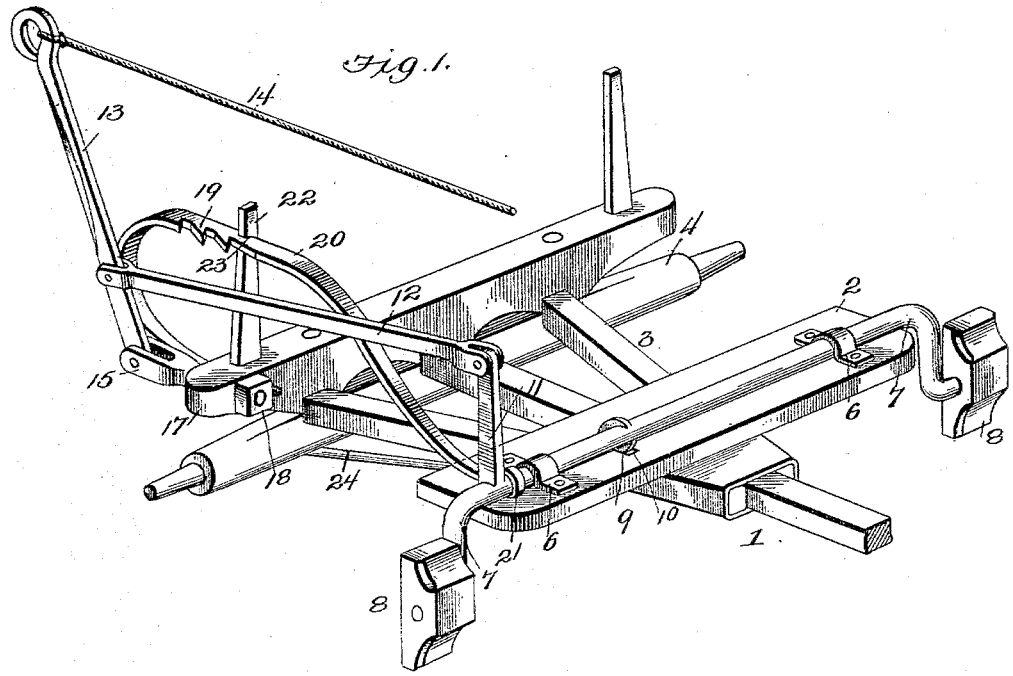
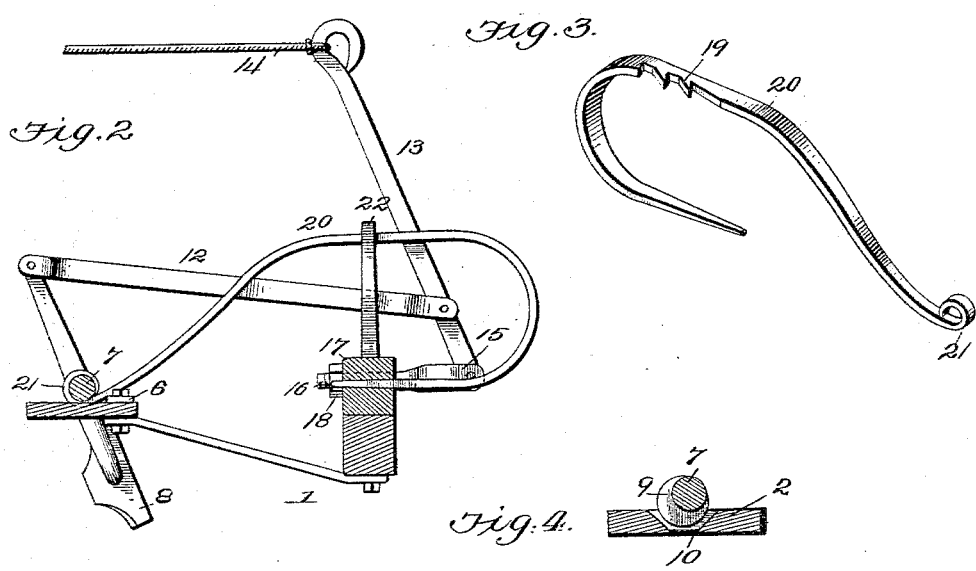
Witnesses
Jos. C. Stack
H. F. Riley
Inventors
James O. Dixon
William R. Tacker
By their Attorneys
C. A. Snow & Co.

UNITED STATES PATENT OFFICE.

JAMES OSCAR DIXON, OF SAVANNAH, AND WILLIAM ROBERT TACKER, OF LOWRYVILLE, TENNESSEE.

VEHICLE-BRAKE.

SPECIFICATION forming part of Letters Patent No. 531,719, dated January 1, 1895.

Application filed October 11, 1894. Serial No. 525,612. (No model.)

*To all whom it may concern:*

Be it known that we, JAMES OSCAR DIXON, residing at Savannah, and WILLIAM ROBERT TACKER, residing at Lowryville, in the county of Hardin, State of Tennessee, citizens of the United States, have invented a new and useful Vehicle-Brake, of which the following is a specification.

The invention relates to improvements in vehicle brakes.

The object of the present invention is to improve the construction of vehicle brakes, and to provide a simple and effective one, which may be readily mounted on an ordinary vehicle, and which is capable of convenient operation from the front of the same.

The invention consists in the construction and novel combination and arrangement of parts, hereinafter fully described, illustrated in the accompanying drawings and pointed out in the claims hereto appended.

In the drawings—Figure 1 is a perspective view of a portion of a running gear provided with a brake constructed in accordance with this invention, and illustrating the position of the parts when the brake is thrown off the wheels. Fig. 2 is a longitudinal sectional view, illustrating the position of the parts when the brake is applied. Fig. 3 is a detail perspective view of the ratchet bar. Fig. 4 is a detail sectional view illustrating the manner of securing the brake shaft against longitudinal movement.

Like numerals of reference indicate corresponding parts in all the figures of the drawings.

1 designates the rear portion of a running gear provided with a transverse supporting bar 2, secured to the upper faces of the rear hounds 3, and located in advance of the rear axle 4, and provided with bearings 6, located at the ends of the transverse bar and receiving a transverse brake shaft 7. The brake shaft 7 has its ends bent downward and outward, and terminating in advance of the hind wheels (not shown), and carrying brake-shoes 8; and it is prevented from moving longitudinally in its bearings by a cam-shaped flange 9, secured to it and located in the slot 10 of the transverse bar. An arm 11 extends upward from one end of the brake-shaft 7, and is connected by a rearward extending bar 12, with an operating lever 13, which may be connected with the front of the vehicle by any suitable means, such as a rope 14 or the like. The connecting bar 12 has its ends bifurcated, and pivoted to the arm and the operating lever.

The lower end of the operating lever is fulcrumed in a support 15, which is bifurcated to receive the lever, and which is provided with a threaded shank 16 passed through the bolster 17, and provided with a nut 18 bearing against the front face of the bolster. The rear edge of the operating lever is beveled, and is arranged to engage ratchet teeth 19 of a ratchet bar 20, which is provided at its front end with an eye to receive the brake-shaft, and which extends upward and rearward to the adjacent standard 22, and which has its rear portion curved downward and extended forward through the bolster 17, and forming an approximately U-shaped rear portion. The eye 21, at the front of the ratchet bar, is located adjacent to the arm 11, and the upper end of the standard 22, is recessed at 23 to form a supporting shoulder; and the ratchet bar is suitably secured to the top of the standard.

In applying the brake the operating lever is drawn forward by the rope or other connection, until the brake shoes engage the wheels to the desired degree, and the teeth of the ratchet bar are adapted to hold the brake in this position by engaging the operating lever, which may be readily sprung out of engagement with the ratchet bar by a sudden pull of the connecting rope.

The transverse bar 2 is supported adjacent to the operating mechanism by a brace 24, extending from it to the rear axle.

It will be seen that the brake mechanism is simple and comparatively inexpensive in construction, and that it may be readily applied to an ordinary vehicle as it is supported by the rear bolster and the adjacent standard, together with the transverse bar. It will also be seen that the brake is capable of easy operation, and that it is adapted to exert great pressure on the wheels.

Changes in the form, proportion, and the minor details of construction may be resorted to without departing from the principle or sacrificing any of the advantages of this invention.

What we claim is—

1. The combination with a running gear, of a brake shaft carrying brake shoes and journaled on the running gear in advance of the rear axle and provided with an arm, an operating lever detachably fulcrumed on the rear bolster and connected with said arm, and a ratchet bar connected at its front end with the brake shaft, and having its rear portion detachably secured to and supported by the rear bolster and the adjacent standard, and provided with ratchet teeth arranged to be engaged by the operating lever, substantially as described.

2. The combination with a running gear provided in advance of the rear axle with a transverse bar, of a brake-shaft journaled on the transverse bar and carrying brake-shoes and provided with an upwardly extending arm, a support extending rearward from the rear bolster and having a shank extending through the same and provided with a nut, an operating lever fulcrumed at its lower end on the support and connected with said arm, and a ratchet bar provided at its front end with an eye to receive the brake shaft and extending upward and rearward to and supported by the adjacent standard and extending downward in rear of the standard and secured to the bolster, said ratchet bar having teeth arranged adjacent to the operating lever, substantially as and for the purpose described.

3. The combination of a running gear provided with a transverse bar located in advance of the rear axle and provided with a slot, a brake-shaft journaled on the transverse bar and provided with an arm and having a cam-shaped flange arranged in said slot, brake shoes carried by the brake-shaft, a bifurcated support extending rearward from the rear bolster and having a threaded shank passed through the same and provided with a nut, an operating lever fulcrumed in the bifurcation and connected with the arm of the shaft, and a ratchet bar supported at its front end by the shaft and having its rear end supported by the bolster and the adjacent standard, substantially as described.

In testimony that we claim the foregoing as our own we have hereto affixed our signatures in the presence of two witnesses.

JAMES OSCAR DIXON.
WILLIAM ROBERT TACKER.

Witnesses:
A. J. WILLIAMS,
D. W. JOHNSTON.